US008225137B2

(12) United States Patent
White et al.

(10) Patent No.: US 8,225,137 B2
(45) Date of Patent: Jul. 17, 2012

(54) SYSTEM AND METHOD FOR PROVIDING MEDIA SERVER REDUNDANCY IN A NETWORK ENVIRONMENT

(75) Inventors: Christopher J. White, Los Altos, CA (US); Jerry B. Scott, Los Altos, CA (US); Daniel R. Cook, San Jose, CA (US); Monica I. Morogan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/876,120

(22) Filed: Sep. 4, 2010

(65) Prior Publication Data

US 2012/0060052 A1    Mar. 8, 2012

(51) Int. Cl.
*G06F 11/00* (2006.01)

(52) U.S. Cl. .......................................................... 714/12

(58) Field of Classification Search ........................ None
See application file for complete search history.

(56) References Cited

U.S. PATENT DOCUMENTS

| | | | | |
|---|---|---|---|---|
| 5,974,503 A * | 10/1999 | Venkatesh et al. | ............ | 711/114 |
| 5,987,621 A | 11/1999 | Duso et al. | | |
| 6,625,750 B1 * | 9/2003 | Duso et al. | ....................... | 714/11 |
| 7,159,234 B1 * | 1/2007 | Murphy et al. | .................. | 725/87 |
| 2004/0025186 A1 * | 2/2004 | Jennings et al. | ................. | 725/93 |
| 2007/0217589 A1 | 9/2007 | Martin et al. | | |
| 2008/0043645 A1 | 2/2008 | Anson et al. | | |
| 2008/0120404 A1 | 5/2008 | Sakai | | |
| 2010/0214908 A1 * | 8/2010 | Ralev | ............................ | 370/221 |
| 2010/0235681 A1 * | 9/2010 | Suetsugu et al. | ................. | 714/15 |

FOREIGN PATENT DOCUMENTS

| | | |
|---|---|---|
| EP | 1962507 | 8/2008 |
| WO | WO 2012/031268 | 3/2012 |

OTHER PUBLICATIONS

U.S. Appl. No. 12/876,121, filed Sep. 4, 2010, entitled "System and Method for Providing Media Server Redundancy in a Network Environment," Inventors: Christopher J. White et al.
PCT Nov. 11, 2011 Notification of the Transmittal of the International Search Report and the Written Opinion of the International Searching Authority, or the Declaration from the International Application Serial No.PCT/US2011/050431.
PCT Dec. 8, 2011 Notification of the Transmittal of the International Search Report and the Written Opinion of the International Searching Authority, or the Declaration from the International Application Serial No. PCT/US2011/50415.

* cited by examiner

*Primary Examiner* — Michael Maskulinski
(74) *Attorney, Agent, or Firm* — Patent Capital Group (57) ABSTRACT

A method is provided in one example embodiment and includes evaluating a first plurality of messages from a media server configured to receive a media stream. The first plurality of messages is indicative of an active state for the media server. The method also includes detecting an anomaly associated with a portion of the first plurality of messages. The anomaly is associated with a failure of the media server. The method can also include activating a failover media server to receive the media stream based on the anomaly, and evaluating a second plurality of messages. The second plurality of messages is indicative of a resumed active state for the media server that experienced the failure. The failover media server can be deactivated based on the resumed active state. Media metadata can be communicated from the failover media server to the media server that experienced the failure.

20 Claims, 6 Drawing Sheets

SYSTEM AND METHOD FOR PROVIDING MEDIA SERVER REDUNDANCY IN A NETWORK ENVIRONMENT

TECHNICAL FIELD

This disclosure relates in general to the field of network communications, and more particularly, to providing media server redundancy in a network environment.

BACKGROUND

Media systems are currently used in a number of useful applications. For example, security systems can employ media servers to capture surveillance audio and video. Such systems are often complex: particularly in large installations, where elements are widely distributed. Providing redundancy and continuity in security systems is both critical and challenging. Current Internet protocol (IP) networks being used for recording streaming media may have limited redundancy in the case of failures. Such failures are typically disruptive to streaming and, further, are noticeable to users. When a media server fails, the streaming media is abruptly interrupted until a viable backup server is found. This discovering activity causes a significant delay in the streaming media: both in the case of live or recorded data. Accordingly, the ability to properly manage data streams presents a significant challenge to equipment vendors, service providers, and network operators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes evaluating a first plurality of messages from a media server configured to receive a media stream. The first plurality of messages is indicative of an active state for the media server. The method also includes detecting an anomaly associated with a portion of the first plurality of messages. The anomaly is associated with a failure of the media server. The method can also include activating a failover media server to receive the media stream based on the anomaly, and evaluating a second plurality of messages. The second plurality of messages is indicative of a resumed active state for the media server that experienced the failure. The failover media server can be deactivated based on the resumed active state. Media metadata can be communicated from the failover media server to the media server that experienced the failure.

In more specific implementations, the media metadata can include information related to backup recordings made when the failover media server was activated. The media metadata can include a timestamp and a location for at least one of the backup recordings. In other implementations, the method can include recording the media stream in a first database associated with the media server if the failover media server is not activated, and recording the media stream in a second database associated with the failover media server if the failover media server is activated. The actual media stream can be received from various media endpoints, which may include (but is not limited) to Internet Protocol (IP) cameras, analog cameras (e.g., connected to analog encoders), an analog matrix switch, microphones etc. A last known recording data of the media server can be communicated to the failover media server. Additionally, a notification can be sent to an operations manager element when the failover media server is activated.

Example Embodiments

Figure 1A:
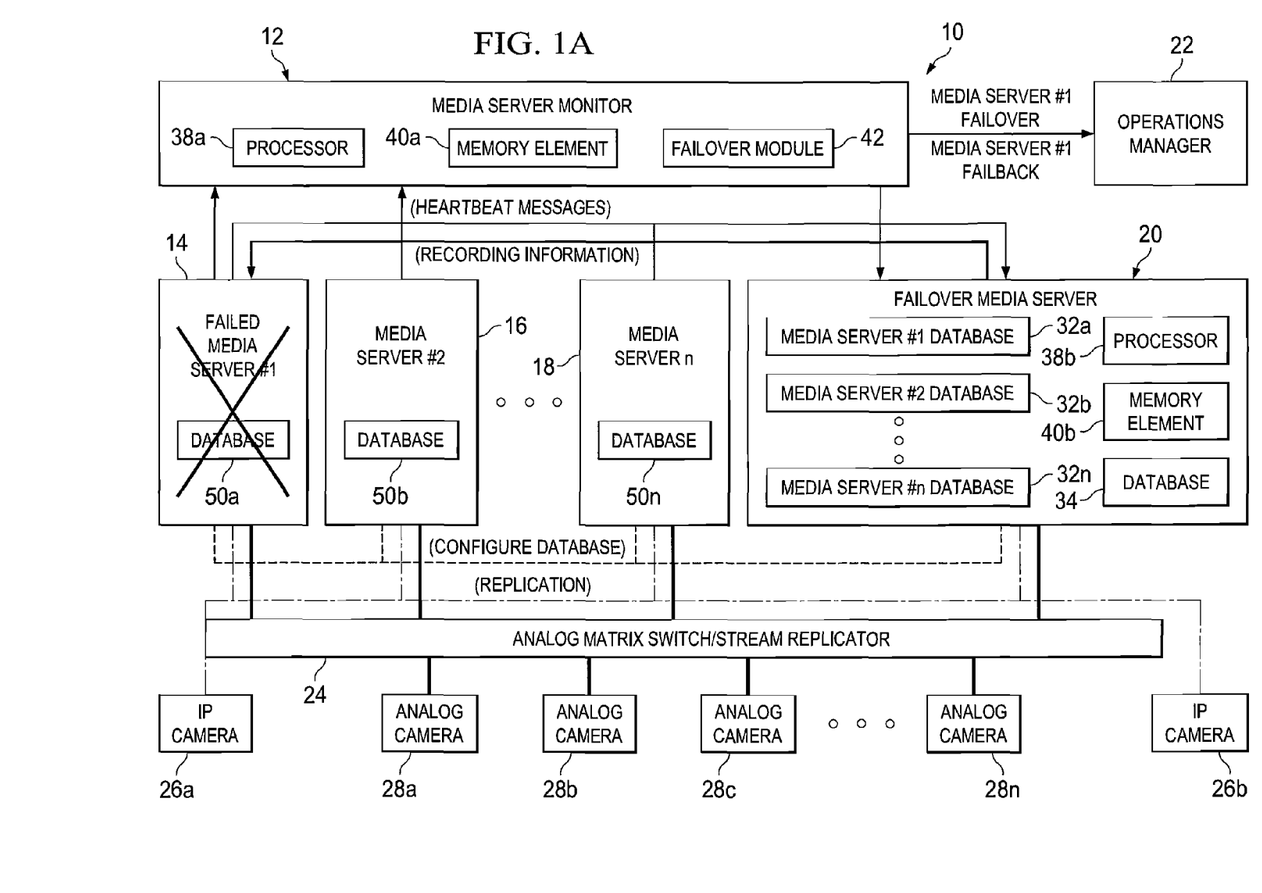
FIG. 1A is a block diagram illustrating an example embodiment of a media system that provides media server redundancy for a media server failure in a network environment.

Turning to FIG. 1A, FIG. 1A is a simplified block diagram of a media system 10 for offering media server failover redundancy in a network environment. FIG. 1A illustrates an example scenario in which a media server has failed and a failover media server is being activated in its place. FIG. 1A includes a media server monitor 12, a media server 14, a media server 16, a media server 18, a failover media server 20, an operations manager 22, an analog matrix switch 24 (which can include a stream replicator, as depicted), a set of Internet protocol (IP) cameras 26a-26n, and a set of analog cameras 28a-28n. In general terms, failover is the process by which failover media server 20 is activated for streaming and recording from IP cameras 26a-26n and/or analog cameras 28a-28n when a primary media server (such as media server 14) for these cameras fails, when an analog port on the primary media server fails, etc.

Media server monitor 12 can include a processor 38a, a memory element 40a, and a failover module 42. The term memory element as used herein includes any volatile or persistent medium, such as an electrical circuit, magnetic disk, or optical disk, in which a computer can store data or software for any duration. A single memory may encompass (and be distributed across) a plurality of media. Media server monitor 12 may alternatively share a memory element and a processor with another network element such as failover media server 20. Media server monitor 12 is configured to exchange information with operations manager 22, media servers 14-18, and failover media server 20.

Each of media servers 14, 16, 18 can include a processor, a memory element, and a database 50a-50n, respectively. Databases 50a-50n can be provisioned to store configuration data, media recordings, media metadata, etc. Configuration data can include such information as network addresses of media sources (e.g., IP addresses or media access control (MAC) addresses of cameras), media source types, recording events, recording types, conditions for which media sources would be triggered, and/or any other suitable parameter relevant to capturing information. Media metadata can include information related to backup recordings made when a media server fails, such as time stamps and locations for media recordings. In certain instances, the media metadata may be encompassed within the broad term 'configuration data.'

The configuration information can be replicated to databases 32a-32n associated with failover media server 20. In one instance, databases 32a-32n can reside within failover media server 20 to provide additional fault tolerance in the event of a failure in the network. Alternatively, databases 32a-32n may be provisioned in any other suitable location. Media servers 14-18 are configured to exchange information with media server monitor 12 and failover media server 20.

In operation, failover media server 20 can act on behalf of any of its assigned failed media servers (i.e., the media servers for which failover media server 20 is responsible in the case of failure). Failover media server 20 should have the configuration data for continuing to receive the information being captured by cameras 26a-26n and/or analog cameras 28a-28n. For example, certain cameras may be provisioned for motion detection (e.g., "record on motion" in the case of provisioning for buildings or parking lots where there is little activity). In other cases, the cameras can systematically capture live streams in a constant manner. This configuration data can effectively be incorporated into the operations of failover media server 20, where the operations that were previously being carried out by the failed media server would then be performed by failover media server 20.

It should be noted that failover media server 20 can continue to receive updates for the configuration data. In one particular example, and in an effort to provide consistency, a failed media server does not have its configuration data updated (e.g., it may be read-only data for certain designated time interval). Failover media server 20 can access any appropriate database for retrieving configuration data to mimic the operations of the failed media server. Hence, the configuration data of the failed media server is replicated such that it can successfully be used by failover media server 20. For example, database replication software can be used to copy over configuration data from the failed media server to failover media server 20. When the failed media server is revived, failover media server 20 can inform this device that failover media server 20 recorded certain types of information, during certain times, from certain cameras, etc. In one particular example, this recorded information is maintained by failover media server 20, which does not necessarily forward the recordings onto the failed media server (e.g., after the failure has been cured and the failed media server is functional again). Instead, failover media server 20 can simply maintain this information that was recorded during the failure. Alternatively, this recorded information could be passed to the failed media server (or to any other appropriate location) to be coordinated, processed, incorporated into the existing recordings, appended to a current repository of recordings, etc.

Failover media server 20 generally includes a processor 38b, a memory element 40b, databases 32a-32n, and a database 34. Alternatively, failover media server 20 may share a processor and a memory element with another network element, such as media server monitor 12 in certain example implementations. Databases 32a-32n can offer replications of configuration data in databases 50a-50n, respectively, while database 34 can store information concerning failover media server 20 such as information related to backup recordings when a given media server fails.

In one particular embodiment, media system 10 can be associated with a local area network (LAN). In other embodiments, media system 10 would be equally applicable to other network environments, such as a service provider digital subscriber line (DSL) deployment, an enterprise wide area network (WAN) deployment, cable scenarios, broadband generally, fixed wireless instances, fiber to the x (FTTx), which is a generic term for any broadband network architecture that uses optical fiber in last-mile architectures. Alternatively, media system 10 can interface with any wireless LAN (WLAN), metropolitan area network (MAN), wide area network (WAN), extranet, Intranet, virtual private network (VPN), or any other appropriate architecture or system that facilitates data propagation in a network environment.

Media system 10 may include a configuration capable of transmission control protocol/internet protocol (TCP/IP) communications for the transmission and/or reception of packets in a network. Media system 10 may also operate in conjunction with a user datagram protocol/IP (UDP/IP) or any other suitable protocol, where appropriate and based on particular needs. Unless otherwise indicated in discussions below, network elements can use publicly available protocols or messaging services to communicate with each other through a network.

A network can comprise any number of hardware or software elements coupled to (and in communication with) each other through a communications medium. Network elements may include any suitable hardware, software, components, modules, interfaces, or objects operable to exchange information in a network environment, such as routers, switches, gateways, bridges, load-balancers, firewalls, inline service nodes, proxies, clients, or servers. This may be inclusive of appropriate algorithms and communication protocols that allow for the effective exchange of data or information. A communications medium can include any physical, optical, electromagnetic, or other medium through which network elements can transmit data.

Referring again to FIG. 1A, operations manager 22 can operate as the administrative interface for media system 10. Operations manager 22 is configured to communicate with media server monitor 12, failover media server 20, and various media clients. Administrators of media system 10 can use operations manager 22 to configure the other elements of media system 10, such as assigning media servers to particular media streams, particular subscribers, particular endpoints, etc.

Analog matrix switch 24 is capable of encoding, replicating, and switching analog video signals from one port to another. Alternatively, analog signals may pass through analog matrix switch 24 without encoding and then be encoded by a given media server. Analog cameras 28a-28n may also be connected to a media server, which encodes the analog signal without passing through analog matrix switch 24.

For media system 10 to support the failover of cameras directly attached to media server analog ports, the architecture can allow the analog video feed for a camera to be duplicated to another media server. Such duplication can involve failover media server 20. This can be achieved with network elements such as analog matrix switch 24, a video amplifier with multiple outputs, or any other suitable device or mechanism. Although only one failover media server 20 is represented in FIG. 1A, additional failover media servers may be added to media system 10 to provide greater fault tolerance, scalability, etc.

Figure 1B:
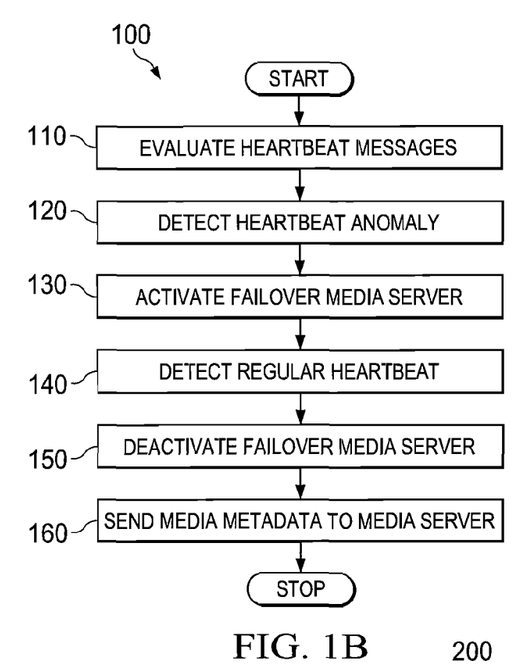
FIG. 1B is a flowchart illustrating operations of an example embodiment of a media system that provides media server redundancy for a media server failure in a network environment.

Turning to FIG. 1B to provide an example flow associated with media system 10, FIG. 1B is a flowchart 100 that further illustrates a failover operation being managed by the architecture. During normal operations, media server 14 receives a media stream from a media source (such as IP camera 26a or analog camera 28a) and stores (i.e., queues, records, maintains, etc.) the media data in database 50a. Each active primary media server 14, 16, and 18, and failover media server 20 can be configured to send heartbeat messages to media server monitor 12 at regular intervals. Alternatively, media server monitor 12 may send status requests (sometimes referred to as a ping, or a keep alive) at regular intervals to each primary media server 14, 16, and 18, in which case the heartbeat messages would be sent only in response to these requests. (Alternatively, there could be a simple awareness of network elements, or a presumption that the provisioned network elements are functional.) Note that all such message possibilities for communicating that a given media server is functional are simply signaling an active state for the media server.

The heartbeat messages can contain data associated with configured, active, and/or failed analog ports and IP devices. The interval period may be configured as desired, but should be sufficiently short to allow minimal delay in detecting an anomaly (i.e., any type of irregularity) in the active state (e.g., heartbeat) messages. In the example embodiments illustrated in FIGS. 1A and 1B, a heartbeat anomaly is a condition in which media server monitor 12 fails to receive X number of heartbeat messages from a primary media server during the configured interval period, where X may be configured to a value suitable for a particular application. For example, in a video surveillance application, X should be a small number such as two. At step 110, media server monitor 12 evaluates the heartbeat messages from each media server 14, 16, and 18, and from failover media server 20.

In typical deployments, multiple IP cameras (or multiple analog cameras) are sending video data (in conjunction with audio data) to a respective media server. When that media server has some sort of failure (which may be software or hardware based, involve a power failure, etc.), the architecture should continue to systematically receive the video information from the cameras. The malfunctioning media server could take a few minutes to cure (e.g., in the context of a reboot), several hours to fix, or alternatively the media server may have to be replaced, upgraded with software, etc. [Note that as used herein in this Specification, the term 'failure' is a broad term meant to connote any possible malfunction (potentially associated with power, hardware, software, communication links, etc.) that may occur in a given device, in the network, in internal components of any given device, etc.]

The failover process can be initiated upon detecting a heartbeat anomaly at step 120. Based on this anomaly condition, media server monitor 12 assumes that the primary media server has failed and activates failover module 42 at step 130. Failover module 42 can then configure failover media server 20 according to the primary media server's configuration information, which has been properly replicated in one of databases 32a-32n. Alternatively, failover module 42 may instruct operations manager 22 or failover media server 20 to download the configuration of analog streams and IP devices associated with failed media server 14.

If a failover media server is not available or does not have sufficient capacity for all of the analog streams and IP devices, then media server monitor 12 can initiate an alarm. The ports of failover media server 20 (and associated IP devices) are then set to an active state, which causes failover module 42 to send commands to analog matrix switch 24 to switch the appropriate analog devices to the appropriate analog ports of failover media server 20. Failover media server 20 can also connect to any configured IP devices and, further, begin recording the streams from those devices in database 34 (or any other suitable location).

Failover module 42 also communicates the last known recording data of failed media server 14 to failover media server 20. This last known recording data can be stored in database 32a. If media server monitor 12 subsequently receives regular heartbeat messages from media server 14 at step 140, then failover module 42 sends a deactivate message to failover media server 20 at step 150. This causes failover media server 20 to terminate recording and to disconnect from the cameras. Heartbeat messages can be treated as "regular" if media server monitor 12 receives a configured number (e.g., X number) of heartbeat messages from a media server during the configured interval period. The X number may be the same value configured for detecting a heartbeat anomaly, or it may be any other value suitable for a particular application. After failover media server 20 disconnects from the cameras, the analog streams and IP devices can be successfully switched back to media server 14. Failover module 42 also notifies media server 14 that failover media server 20 was activated and that it recorded data during the anomaly, as well as the time ranges for the anomaly (as shown at step 160 of FIG. 1B). The media metadata can be stored in database 50a. Similarly, failover media server 20 can store the identity of media server 14 and the anomaly time ranges in database 34. Failover module 42 can also notify operations manager 22 to indicate the current location of each analog stream and IP device. Before detailing additional operations associated with the present disclosure, a brief discussion is provided about the infrastructure of FIG. 1A.

Media server monitor 12 and failover media server 20 are network elements that generally manage (or that cooperate with each other in order to manage and/or coordinate) media protocols in a network environment. This includes the failover features, as outlined herein in the present disclosure. As used herein in this Specification, the term 'network element' is meant to encompass servers, application program interfaces (APIs), proxies, processors, modules, or any other suitable device, component, element, or object operable to exchange information in a network environment. These network elements may include any suitable hardware, software, components, modules, interfaces, or objects that facilitate the operations thereof. This may be inclusive of appropriate algorithms and communication protocols that allow for the effective exchange (reception and/or transmission) of data or information.

Media server monitor 12 and failover media server 20 may share (or coordinate) certain processing operations. Using a similar rationale, their respective memory elements may store, maintain, and/or update data in any number of possible manners. Additionally, because some of these network elements can be readily combined into a single unit, device, or server (or certain aspects of these elements can be provided within each other), some of the illustrated processors may be removed, or otherwise consolidated such that a single processor and/or a single memory location could be responsible for certain activities associated with endpoint management controls. In a general sense, the arrangement depicted in FIG. 1A may be more logical in its representations, whereas a physical architecture may include various permutations/combinations/hybrids of these elements.

In one example implementation, media server monitor 12 and failover media server 20 include software (e.g., as part of failover module 42, etc.) to achieve the intelligent failover management operations, as outlined herein in this document. In other embodiments, this feature may be provided externally to any of the aforementioned elements, or included in some other network element (which may be proprietary) to achieve this intended functionality. Alternatively, several elements may include software (or reciprocating software) that can coordinate in order to achieve the operations, as outlined herein. In still other embodiments, any of the devices of the illustrated FIGURES may include any suitable algorithms, hardware, software, components, modules, interfaces, or objects that facilitate these endpoint management operations.

Figure 2:
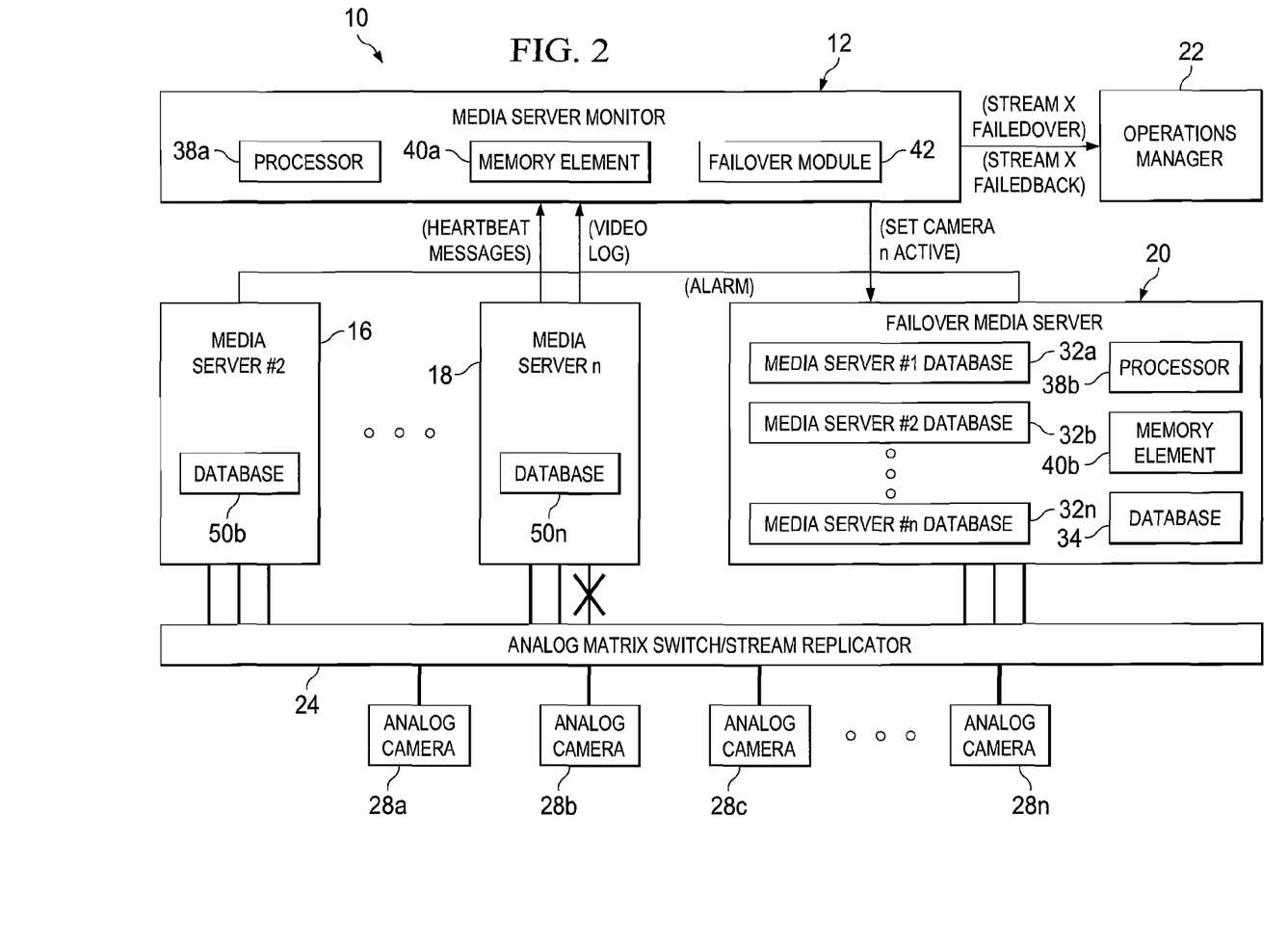
FIG. 2 is a block diagram illustrating an example embodiment of a media system that provides media server redundancy for an analog port failure in a network environment.

FIG. 2 is a simplified block diagram illustrating another example implementation of media system 10. This particular illustration depicts a scenario in which media server monitor 12 detects another type of anomaly, which may be a media loss alarm. This loss alarm can be for an analog port from a media server (e.g., media server 18), or an anomalous condition that the number of active ports in a heartbeat message from a media server does not match the number of configured ports in the heartbeat message. In such a case, failover module 42 can select an available failover media server, such as failover media server 20, and send an activate message to failover media server 20.

Failover module 42 can then configure failover media server 20 according to the primary media server's configuration information, which has been replicated in one of the databases 32a-32n. Alternatively, failover module 42 may instruct operations manager 22 or failover media server 20 to download the configuration of analog streams and IP devices associated with the failed media server (i.e., to the activated failover media server 20 from operations manager 22). In this scenario, the preferred failover media server should have the most available analog ports and the fewest IP devices associated with it. Failover module 42 then signals analog matrix switch 24 to switch the analog camera feed to the appropriate port on failover media server 20 and, further, makes that recording active. If media server 18 subsequently detects media on the lost port, it can send a media detected alarm to media server monitor 12 and, subsequently, update its heartbeat message. When media server monitor 12 receives the media detected alarm and the updated heartbeat message, failover module 42 can instruct failover media server 20 to stop recording and then deactivate the associated port. Note that during an anomaly for a single analog port, failover module 42 sends information to operations manager 22 and to media server 18 to provide location information of the stream (and any associated recording data).

Figure 3A:
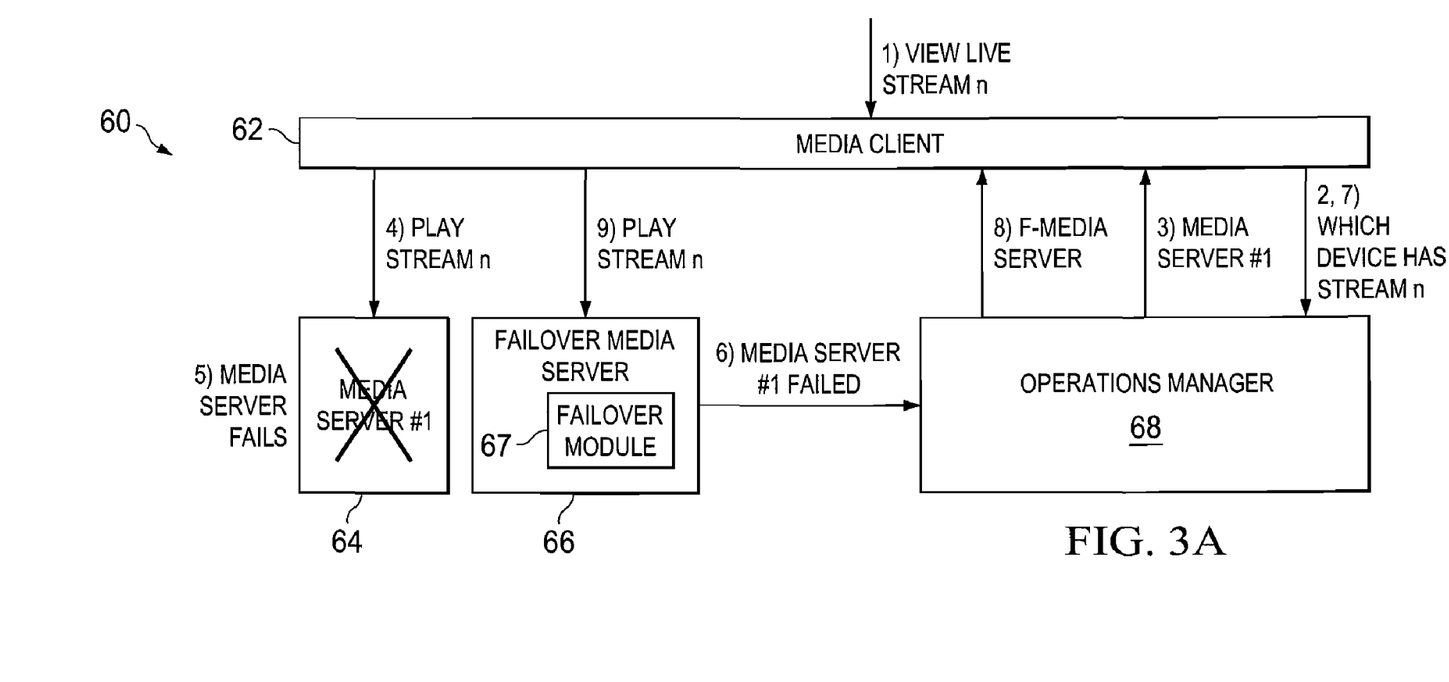
FIG. 3A is a block diagram illustrating an example embodiment of a media system that provides media server redundancy for a media server failure during live viewing in a network environment.

FIG. 3A is a simplified block diagram illustrating potential details associated with one implementation of the present disclosure. More specifically, FIG. 3A illustrates a scenario in which a media client 62 requests a live media stream in a media system 60. Media system 60 is substantially similar to media system 10, and it includes a primary media server 64, a failover media server 66, a failover module 67, and an operations manager 68. Media system 60 illustrates an alternative embodiment in which failover module 42 is integrated with a failover media server, such as failover media server 66. Also illustrated in FIG. 3A is the media client 62, which is typically used by a person to view one or more media streams.

The media client can be any hardware and/or software configured to communicate with the operations manager 68 and media servers in media system 60 (e.g., including media server 64 and failover media server 66), and that is capable of rendering or playing the desired media stream. For example, a common web browser is a type of media client that can be used in such instances, where it would be capable of displaying the media stream.

Note that FIG. 3A includes a series of steps (steps 1-9) that offer a generic overview of how this particular architecture may operate in certain example implementations. These generic steps are further detailed below with reference to FIG. 3B. At step one, the live stream (e.g., a video from a surveillance camera) is being viewed by any suitable endpoint (i.e., a media client). At step two, a determination can be made as to which entity currently is responsible for the live stream. This can involve operations manager 68, where media server #1 is identified as the responsible device at step three. The live stream is suitably played at step four, where the media server fails at step five. A notification is sent to operations manager 68 at step six. The live stream is then coordinated in conjunction with employing failover media server 86. At step seven, there is again an inquiry as to which entity is currently responsible for the live stream. At step eight, failover media server 66 is identified by operations manager 68, where this coordination is sent to media client 62. The live stream is subsequently played by failover media server 66 at step nine, where the endpoint does not experience a disruption in the streaming content.

It should be noted that the term "media source" is simply representative of any suitable component, which can have various potential applications. The media sources are representative of devices that can receive or capture data for network communications. In one particular example, the media sources are representative of cameras that can be used by individuals for virtually any purpose. It should be noted however that the broad term 'media source' is inclusive of devices used to initiate a communication, such as any type of computer, camera, a personal digital assistant (PDA), a laptop or electronic notebook, a wireless access point, a residential gateway, a modem, a cellular telephone, an iPhone, an IP phone, iPad, or any other device, component, element, or object capable of initiating or facilitating voice, audio, video, media, or data exchanges within a network environment.

Along similar lines, the term "media client" is simply representative of any suitable endpoint that seeks to receive network data. The endpoint can be associated with various types of protocols, or potential applications to achieve their intended functionality. The broad term 'endpoint' is inclusive of devices used to initiate a communication, such as any type of web browser, computer, camera, a personal digital assistant (PDA), a laptop or electronic notebook, a wireless access point, a residential gateway, a modem, a cellular telephone, an iPhone, an IP phone, iPad, or any other device, component, element, or object capable of initiating or facilitating voice, audio, video, media, or data exchanges within a network environment. Moreover, endpoints may be inclusive of a suitable interface to the human user, such as a microphone, a display, or a keyboard or other terminal equipment. The endpoints may also be any device that seeks to initiate a communication on behalf of another entity or element, such as a program, a database, or any other component, device, element, or object capable of initiating an exchange within a network environment. Data, as used herein in this document, refers to any type of numeric, voice, video, media, or script data, or any type of source or object code, or any other suitable information in any appropriate format that may be communicated from one point to another.

Moreover, endpoints may be inclusive of a suitable interface to the human user, such as a microphone, a display, or a keyboard or other terminal equipment. The endpoints may also be any device that seeks to initiate a communication on behalf of another entity or element, such as a program, a database, or any other component, device, element, or object capable of initiating an exchange within a network environment. Data, as used herein in this document, refers to any type of numeric, voice, video, media, or script data, or any type of source or object code, or any other suitable information in any appropriate format that may be communicated from one point to another.

Figure 3B:
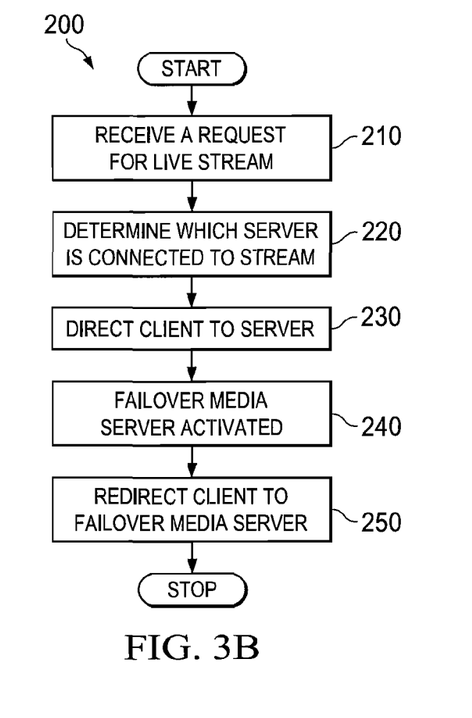
FIG. 3B is a flowchart illustrating operations of an example embodiment of a media system that provides media server redundancy for a media server failure during live viewing in a network environment.

FIG. 3B is a simplified example flowchart 200 that further illustrates an operation of media system 60 for the live media stream play scenario. Operations manager 68 can receive a request for a live stream from media client 62 at step 210. A determination is then made as to which media server is currently supporting the requested media stream (e.g., media server 64), where this activity is shown at step 220. At step 230, operations manager 68 can direct media client 62 to the appropriate media server (e.g., media server 64). Media client 62 can then connect to media server 64 and request the appropriate stream. If media server 64 fails while streaming the media, failover media server 66 can be activated at step 240. When failover media server 66 is activated, operations manager 68 also receives an alarm that provides the identity of failover media server 66. Media client 62 can detect an anomaly, such as the control session for media server 64 disconnecting. Subsequently, media client 62 can execute through its resident retry logic and, potentially, after several failures, it can stop streaming. When operations manager 68 receives the failover notification, it can force a reload of media client 62 with the new address of the live stream from failover media server 66 at step 250. Alternatively, media client 62 may request the new address after detecting an anomaly.

If the stream is subsequently switched back to media server 64, then failover media server 66 redirects media client 62 to the new location of the live stream from media server 64. This can cause media client 62 to reconnect to media server 64 and to request the live stream. During these switches, there may be a loss of media; however, the time of media loss can be kept to a minimum.

Figure 4A:
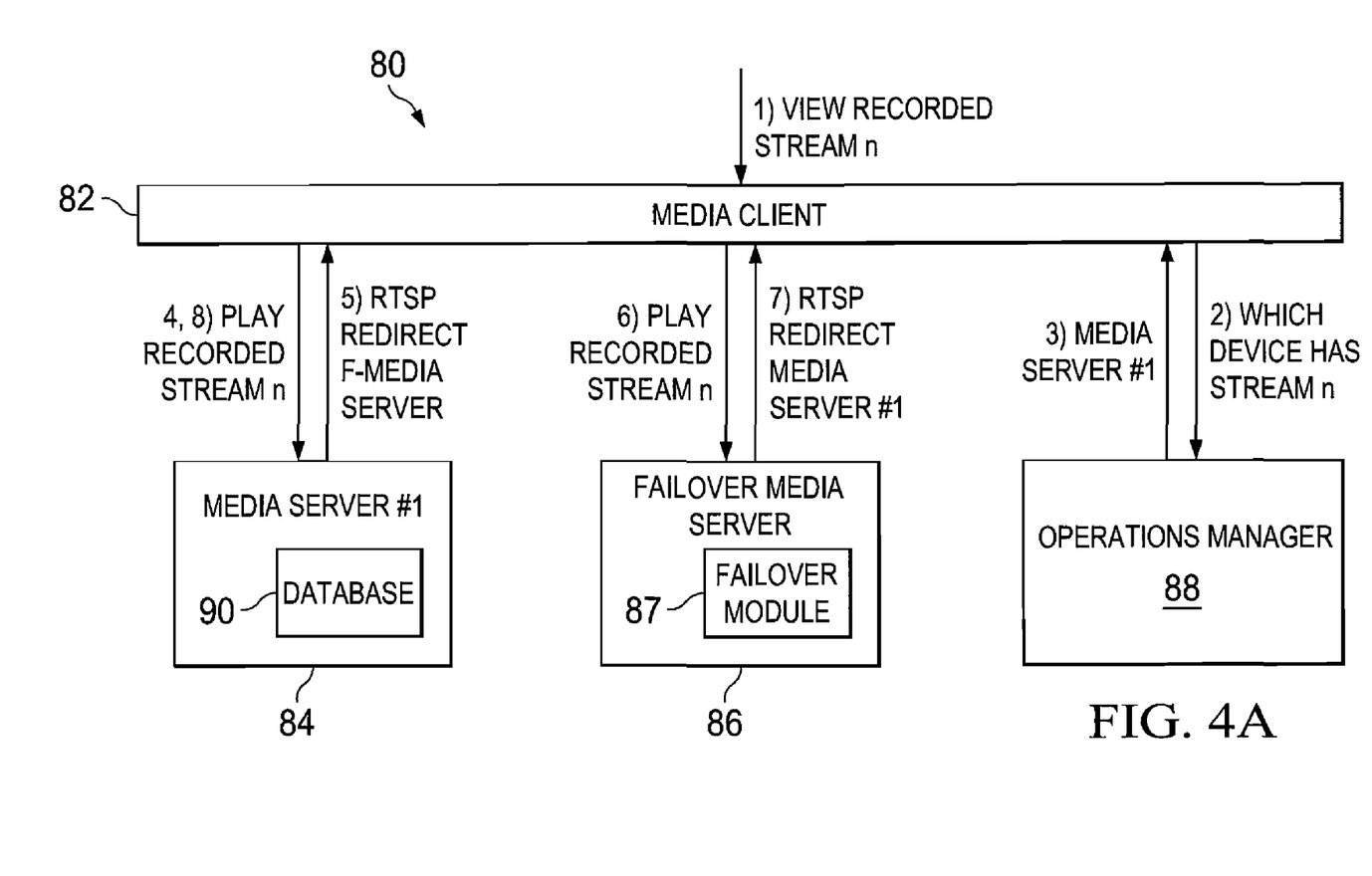
FIG. 4A is a block diagram illustrating an example embodiment of a media system that provides media server redundancy during playback of a recorded media stream in a network environment.

FIG. 4A is a simplified block diagram illustrating another example implementation associated with the present disclosure. More specifically, this particular implementation illustrates a scenario in which a media client 82 requests a recorded media stream in a media system 80. Media system 80 is similar to media system 60, and it can include a primary media server 84, a failover media server 86, a failover module 87, and an operations manager 88. As in media system 60, a failover module 87 can be integrated with failover media server 86.

Note that FIG. 4A includes a series of steps (steps 1-8) that offer a generic overview of how this particular architecture may operate in certain example implementations. These generic steps are further detailed below with reference to FIG. 4B. At step one, the recorded stream (e.g., a video from a surveillance camera) is being viewed by any suitable endpoint. At step two, a determination can be made as to which entity currently is responsible for the live stream. This can involve operations manager 88, where media server #1 is identified as the responsible device at step three. The recorded stream is suitably played at step four, where a redirect occurs at step five. The recorded stream is then coordinated in conjunction with employing failover media server 86. At step seven, there is a real time streaming protocol (RTSP) redirect message sent to media server #1. The recorded stream is again played by media server #1 at step eight, where a normal functionality is resumed.

Figure 4B:
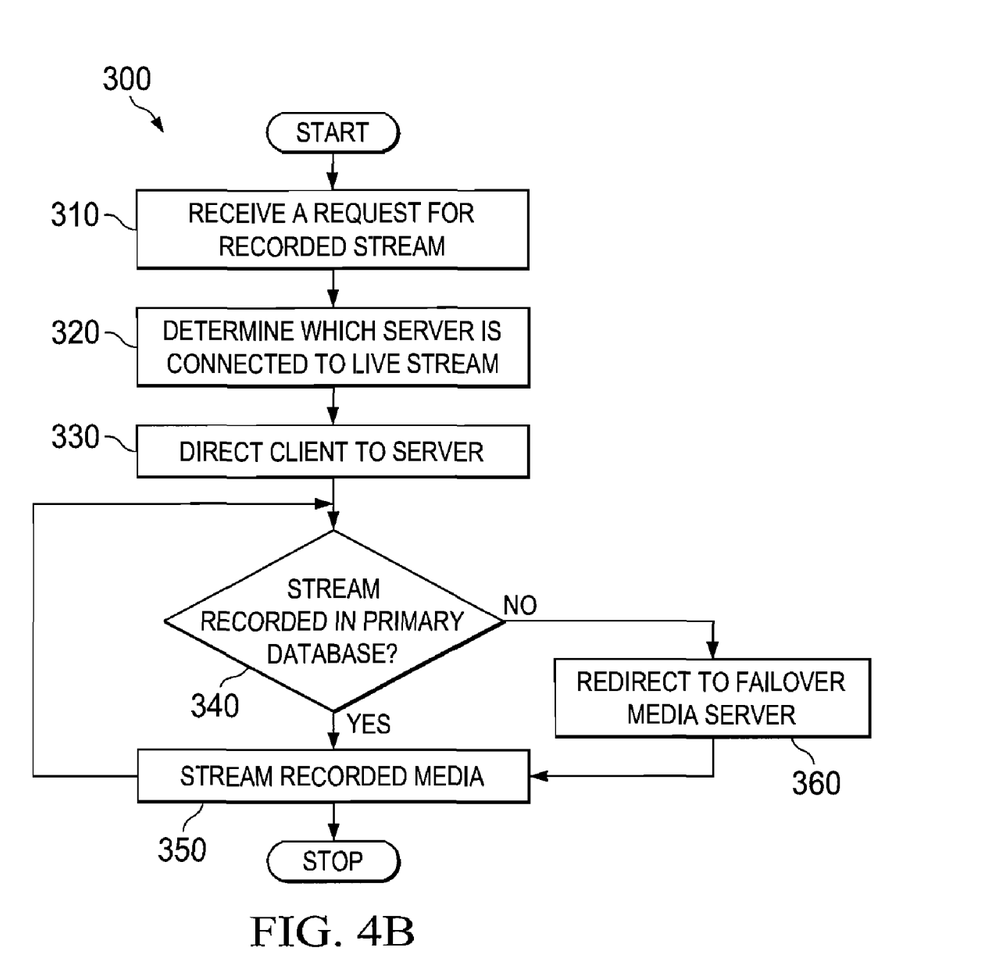
FIG. 4B is a flowchart illustrating the operations of an example embodiment of a media system that provides media server redundancy during playback of a recorded media stream in a network environment.

FIG. 4B is a simplified flowchart 300 that further illustrates the operation of media system 80 in the recorded media stream playback scenario. For recorded media playback, operations manager 88 can receive a request for a recorded media stream from media client 82 at step 310. Operations manager 88 can determine which media server is connected to the live media stream (e.g., media server 84) at step 320. Operations manager 88 can then direct media client 82 to that media server at step 330. Media client 82 requests the recorded media from media server 84. Media server 84 can query database 90 at step 340 to determine if the requested media is stored in database 90, or in a database associated with another media server, such as failover media server 86 for example. If the requested media is stored in database 90, then media server 84 can begin streaming the recorded media to media client 82 at step 350. Otherwise, a redirection signal can be sent to media client 82 at step 360, where the IP address of the media server that has the requested media would be provided.

If media server 84 includes only certain segments of the media, such as may occur if media server 84 failed during capture activities, then media server 84 can send a redirect signal to media client 82. This signal can provide the IP address of the media server with the other segment (such as failover media server 86) and the segment time range on that server. This can cause media client 82 to request this media segment from the other media server. This switching can continue to occur between servers, as media client 82 plays content that spans the media servers, such as media server 84 and failover media server 86, being shown in FIG. 4A. If media client 82 is redirected to a media server that is not active, the playback of the recording can terminate.

Note that in certain example embodiments, the media server redundancy functions described above may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1A] can store data used for the operations described herein. This includes the memory element being able to store software, logic, code, or processor instructions that are executed to carry out the activities described above. A processor can execute any type of instructions associated with the data to achieve the operations detailed above. In one example, the processor [as shown in FIG. 1A] could transform an element or an article (e.g., data) from one state or thing to another state or thing. In another example, the activities described herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the examples provided above, as well as numerous other examples provided herein, interaction may be described in terms of two, three, or four network elements.

However, this has been done for purposes of clarity and example only. In certain cases, it may be easier to describe one or more of the functionalities of a given set of flows by only referencing a limited number of network elements. It should be appreciated that media system 10 (and its teachings) are readily scalable and can accommodate a large number of components, as well as more complicated/sophisticated arrangements and configurations. Accordingly, the examples provided should not limit the scope or inhibit the broad teachings of media system 10 as potentially applied to a myriad of other architectures.

It is also important to note that the steps in the appended diagrams illustrate only some of the possible signaling scenarios and patterns that may be executed by, or within, media system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by media system 10 in that any suitable arrangements, chronologies, configurations, and timing mechanisms may be provided without departing from the teachings provided herein.

Although the present disclosure has been described in detail with reference to particular embodiments, it should be understood that various other changes, substitutions, and alterations may be made hereto without departing from the spirit and scope of the present disclosure. For example, although the previous discussions have focused on certain media server applications, other architectures and protocols could readily adopt the teachings of the present disclosure. For example, the present disclosure can be used in surveillance applications (e.g., such as casino environments, building security scenarios, etc.) and be equally applicable to video conferencing scenarios in which communications are real-time (e.g., on-demand), where speech and video data can effectively be captured and failover scenarios.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    evaluating a first plurality of messages from a media server configured to receive a media stream, wherein the first plurality of messages is indicative of an active state for the media server;
    detecting an anomaly associated with a portion of the first plurality of messages, wherein the anomaly is associated with a failure of the media server;
    activating a failover media server to receive the media stream based on the anomaly;
    evaluating a second plurality of messages, wherein the second plurality of messages is indicative of a resumed active state for the media server that experienced the failure;
    deactivating the failover media server based on the resumed active state; and
    communicating media metadata from the failover media server to the media server that experienced the failure, wherein the media metadata includes information related to backup recordings made when the failover media server was activated.

2. The method of claim 1, wherein the media metadata includes a timestamp and a location for at least one of the backup recordings.

3. The method of claim 1, further comprising:
    recording the media stream in a first database associated with the media server if the failover media server is not activated; and
    recording the media stream in a second database associated with the failover media server if the failover media server is activated.

4. The method of claim 1, further comprising:
    receiving a request from an endpoint to view the media stream; and
    directing the endpoint to the failover media server if the failover media server is activated.

5. The method of claim 1, wherein the media stream is received from an analog matrix switch.

6. The method of claim 1, wherein the anomaly is a media loss alarm for an analog port associated with an analog camera, and wherein the failover media server is activated to receive the media stream from the analog camera.

7. The method of claim 1 further comprising:
    communicating a last known recording data of the media server that experienced the failure to the failover media server; and
    notifying an operations manager element when the failover media server is activated.

8. Logic encoded in one or more non-transitory media that includes code for execution and when executed by a processor operable to perform operations comprising:
    evaluating a first plurality of messages from a media server configured to receive a media stream, wherein the first plurality of messages is indicative of an active state for the media server;
    detecting an anomaly associated with a portion of the first plurality of messages, wherein the anomaly is associated with a failure of the media server;
    activating a failover media server to receive the media stream based on the anomaly;
    evaluating a second plurality of messages, wherein the second plurality of messages is indicative of a resumed active state for the media server that experienced the failure;
    deactivating the failover media server based on the resumed active state; and
    communicating media metadata from the failover media server to the media server that experienced the failure, wherein the media metadata includes information related to backup recordings made when the failover media server was activated.

9. The logic of claim 8, wherein the media metadata includes a timestamp and a location for at least one of the backup recordings.

10. The logic of claim 8, the operations further comprising:
recording the media stream in a first database associated with the media server if the failover media server is not activated; and
recording the media stream in a second database associated with the failover media server if the failover media server is activated.

11. The logic of claim 8, the operations further comprising:
receiving a request from an endpoint to view the media stream; and
directing the endpoint to the failover media server if the failover media server is activated.

12. The logic of claim 8, wherein the media stream is received from an analog matrix switch.

13. The logic of claim 8, wherein the anomaly is a media loss alarm for an analog port associated with an analog camera, and wherein the failover media server is activated to receive the media stream from the analog camera.

14. The logic of claim 8, the operations further comprising:
communicating a last known recording data of the media server that experienced the failure to the failover media server; and
notifying an operations manager element when the failover media server is activated.

15. An apparatus, comprising:
a memory element configured to store code;
a processor operable to execute instructions associated with the code; and
a failover module configured to interface with the memory element and the processor such that the apparatus can:
evaluate a first plurality of messages from a media server configured to receive a media stream, wherein the first plurality of messages is indicative of an active state for the media server;
detect an anomaly associated with a portion of the first plurality of messages, wherein the anomaly is associated with a failure of the media server;
activate a failover media server to receive the media stream based on the anomaly;
evaluate a second plurality of messages, wherein the second plurality of messages is indicative of a resumed active state for the media server that experienced the failure;
deactivate the failover media server based on the resumed active state; and
communicate media metadata from the failover media server to the media server that experienced the failure, wherein the media metadata includes information related to backup recordings made when the failover media server was activated.

16. The apparatus of claim 15, wherein the media metadata includes a timestamp and a location for at least one of the backup recordings.

17. The apparatus of claim 15, further comprising:
a first database associated with the media server, wherein the media stream is recorded in the first database if the failover media server is not activated, and wherein the media stream is recorded in a second database associated with the failover media server if the failover media server is activated.

18. The apparatus of claim 15, wherein the media stream is received from an analog matrix switch.

19. The apparatus of claim 15, wherein the anomaly is a media loss alarm for an analog port associated with an analog camera, and wherein the failover media server is activated to receive the media stream from the analog camera.

20. The apparatus of claim 15, wherein a last known recording data of the media server that experienced the failure is communicated to the failover media server, and wherein a notification is sent to an operations manager element when the failover media server is activated.

* * * * *